United States Patent
Wei et al.

(10) Patent No.: US 12,533,852 B2
(45) Date of Patent: Jan. 27, 2026

(54) PRECERAMIC INTERFACIAL AND SUPPORT STRUCTURES FOR INORGANIC MATERIAL PRINTING AND METHODS THEREOF

(71) Applicant: XEROX CORPORATION, Norwalk, CT (US)

(72) Inventors: Junhua Wei, Palo Alto, CA (US); Gregory Brian Anderson, Emerald Hills, CA (US); Daniel Bullard, Palo Alto, CA (US); David Mathew Johnson, San Francisco, CA (US)

(73) Assignee: XEROX CORPORATION, Norwalk, CT (US)

( * ) Notice: Subject to any disclaimer, the term of this patent is extended or adjusted under 35 U.S.C. 154(b) by 159 days.

(21) Appl. No.: 18/471,475

(22) Filed: Sep. 21, 2023

(65) Prior Publication Data
US 2025/0100222 A1    Mar. 27, 2025

(51) Int. Cl.
*B29C 64/336* (2017.01)
*B29C 64/227* (2017.01)
(Continued)

(52) U.S. Cl.
CPC .......... *B29C 64/336* (2017.08); *B29C 64/227* (2017.08); *B29C 64/295* (2017.08);
(Continued)

(58) Field of Classification Search
CPC ... B29C 64/336; B29C 64/227; B29C 64/295; B29C 64/40; B29C 64/106;
(Continued)

(56) References Cited

U.S. PATENT DOCUMENTS

| 5,207,371 A | 5/1993 | Prinz et al. |
| 9,556,525 B2 | 1/2017 | Dierkes et al. |

(Continued)

OTHER PUBLICATIONS

3D Printing Nerd, "Simplify3D 4.0—PVA Support Interface Layers / Optimize Your Soluble Supports," Youtube 1 Video, Jul. 25, 2017, downloaded from the Internet, URL: https://www.youtube.com/watch?v=ICt4XvXgbYI, 2 pages.

*Primary Examiner* — Michael M. Robinson
(74) *Attorney, Agent, or Firm* — MH2 Technology Law Group LLP

(57) ABSTRACT

A system and method of additive manufacturing includes i) forming a first layer, the first layer may include at least one material chosen from an article material, a support structure material and an interfacial material. The method also includes ii) forming an additional layer on the first layer, the additional layer may include at least one material chosen from the article material, the support structure material and the interfacial material. The method also includes iii) repeating ii) one or more times to form a three-dimensional build may include an article and at least one support structure attached to the article at an interface, the interface may include the interfacial material formed during one or more of i), ii) or iii), and the interfacial material may include a preceramic. An interfacial material may include a preceramic or further include carbon, aluminum oxide, or silicon carbide.

16 Claims, 2 Drawing Sheets

(51) Int. Cl.
  *B29C 64/295*  (2017.01)
  *B29C 64/40*   (2017.01)
  *B33Y 10/00*   (2015.01)
  *B33Y 30/00*   (2015.01)
  *B33Y 70/00*   (2020.01)

(52) U.S. Cl.
  CPC .............. *B29C 64/40* (2017.08); *B33Y 10/00* (2014.12); *B33Y 30/00* (2014.12); *B33Y 70/00* (2014.12)

(58) Field of Classification Search
  CPC ..... B29C 64/209; B29C 64/321; B33Y 10/00; B33Y 30/00; B33Y 70/00; B33Y 70/10; B22F 12/00
  See application file for complete search history.

(56) References Cited

U.S. PATENT DOCUMENTS

| | | | |
|---|---|---|---|
| 2017/0297098 A1 | 10/2017 | Myerberg et al. | |
| 2019/0193335 A1* | 6/2019 | Giller | B29C 64/118 |
| 2019/0270240 A1* | 9/2019 | Wolf | B29C 64/264 |
| 2019/0337235 A1* | 11/2019 | Moosberg | B33Y 30/00 |
| 2021/0179759 A1* | 6/2021 | Lee | C04B 35/14 |
| 2023/0173744 A1* | 6/2023 | Qui | B33Y 30/00 |
| | | | 264/401 |
| 2025/0100223 A1 | 3/2025 | Wei et al. | |

* cited by examiner

PRECERAMIC INTERFACIAL AND SUPPORT STRUCTURES FOR INORGANIC MATERIAL PRINTING AND METHODS THEREOF

TECHNICAL FIELD

The present teachings relate generally to additive manufacturing components and methods and, more particularly, to the use of various materials as supporting or interfacial structures for components fabricated using additive manufacturing.

BACKGROUND

Because additive manufacturing is carried out one layer at a time, support structures are often employed to support the structure during the printing process. These support structures can take the form of, for example, a plurality of pillars that support an overhang structure of a part being printed. The support structures serve multiple functions. For example, they provide structural stability to the layers deposited as an article being printed (sometimes referred to as a "part") widens out from a narrower base region. The support provided by these structures allows more complex geometries to be printed and can allow for reduced weight of the final part. Additionally, support structures allow for improved thermal management during printing, especially when printing metals. These structures provide a path for thermal energy to move from the part to heat sinks, or from heat sources into the part. Support structures can be developed using the same material being used to make the part, or if the printer has the capability to print multiple materials, can be printed from a second material.

One problem with many support structures, especially with metal printing, is they are not easily removed from the part. A significant amount of time and/or money can be spent during "post processing" to fully remove the support structures and smooth or polish the remaining rough areas left on the part surface. Further, such support structures can result in degraded quality of the final printed part surface.

Improved support structures and methods of additive manufacturing that employ the support structures would be a desirable step forward in the art.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method of additive manufacturing includes i) forming a first layer, the first layer may include at least one material chosen from an article material, a support structure material and an interfacial material. The method also includes ii) forming an additional layer on the first layer, the additional layer may include at least one material chosen from the article material, the support structure material and the interfacial material. The method also includes iii) repeating ii) one or more times to form a three-dimensional build may include an article and at least one support structure attached to the article at an interface, the interface may include the interfacial material formed during one or more of i), ii) or iii), and the interfacial material may include a preceramic. Implementations of the method of additive manufacturing include where the additional layer may include an interfacial material. The method of additive manufacturing may include pyrolyzing the interfacial material after forming the additional layer. Pyrolyzing the interfacial material is conducted at a higher temperature as compared to forming the article. The method of additive manufacturing may include conditioning the preceramic interfacial material to transform the preceramic material from an organic structure to an inorganic structure. The conditioning is applied layer by layer. The conditioning further may include heating in an inert environment at a temperature from about 300° C. to about 900° C. The interfacial material may include benzoxazine. The interfacial material may include an inorganic filler. The inorganic filler may include aluminum oxide. The article material may include a metal. The article material may include a material chosen from glass, salt, or a combination thereof. The interfacial material is deposited by ejection. The method of additive manufacturing may include removing a portion of the article from another portion of the article at an interface location. The support structure material may include a metal, a glass, a salt, or a combination thereof.

An additive manufacturing system includes a reservoir configured to receive and melt a print material. The system also includes an ejector having a nozzle that is fluidly connected to the reservoir to receive melted print material from the reservoir. The system also includes a platform positioned opposite the ejector. The system also includes at least one actuator operatively connected to at least one of the platform and the ejector, the at least one actuator being configured to move the at least one of the platform and the ejector relative to one another. The system also includes a controller operatively connected to the reservoir, the ejector, and the at least one actuator, the controller being configured to i) form a first layer, the first layer may include at least one material chosen from an article material, a support structure material and an interfacial material. The system is also configured to ii) form an additional layer on the first layer, the additional layer may include at least one material chosen from the article material, the support structure material and the interfacial material. The system is also configured to iii) repeat ii) one or more times to form a three-dimensional build may include an article and at least one support structure attached to the article at an interface, the interface may include the interfacial material formed during one or more of i), ii) or iii), the interfacial material may include a preceramic. Implementations of the additive manufacturing system include where the controller is further configured to pyrolyze the interfacial material after forming the additional layer. The interfacial material may include benzoxazine. The interfacial material may include an inorganic filler.

A printed article includes a three-dimensional article, a support structure attached to at least a portion of the three-dimensional article, and an interfacial material affixed between the three-dimensional article and the support structure, and where the interfacial material may include a preceramic. The printed article may include where the interfacial material further includes carbon, aluminum oxide, or silicon carbide.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
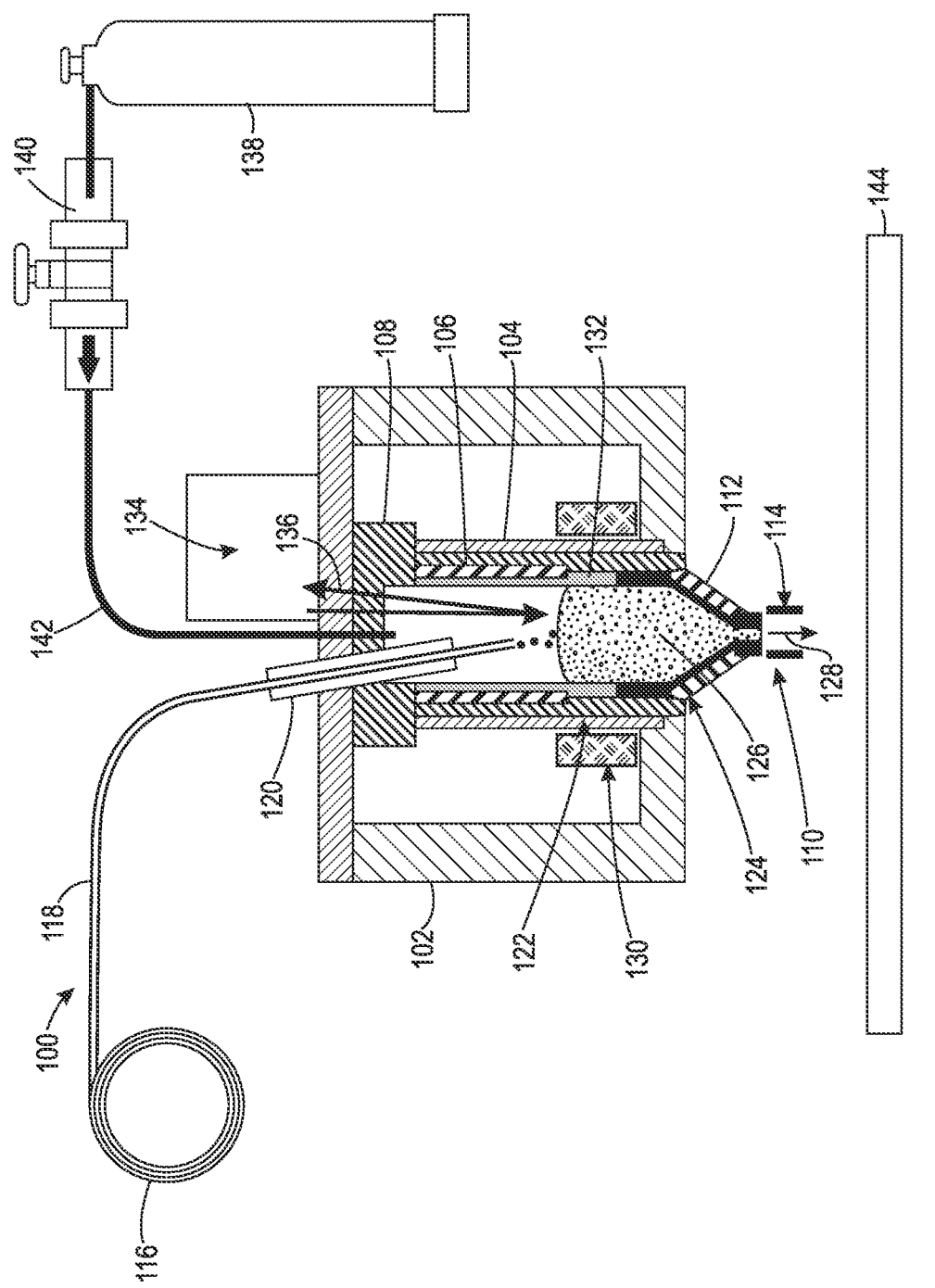
FIG. 1 depicts a schematic cross-sectional view of a single liquid metal ejector jet of a 3D printer (e.g., a MHD printer and/or multi-jet printer) used in additive manufacturing, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

The present teachings provide a solution for issues related to interfaces for inorganic printing, such as metals, oxide materials, and salt. An exemplary example of printed preceramic material can be provided as an interface to separate a printed inorganic material object or as a support structure to hold printed inorganic material during an additive manufacturing operation.

Printing an inorganic material to form complex structures can be difficult in certain examples because there are few materials that can withstand >300° C. temperature at ambient conditions while maintaining inactive interfaces between inorganic materials and other materials. An interlayer can be enabling in separating inorganic material during printing or provide support structures during printing. In current examples, the use of another inorganic material that does not react with a first inorganic material as an interface layer can be employed. This method can be limited by the material combination and choices. The present teachings provide the use of an interfacial material, such as a preceramic resin material or ceramic precursor, during printing to demonstrate a condition to improve the interaction and wetting between the interfacial material and an inorganic material. Certain inorganic materials having a pyrolysis temperature from ~300° C. to ~900° C. can be demonstrated to wet on a high-temperature preceramic-based material under the proposed conditions in the present teachings. Materials such as preceramics, such as benzoxazine have also been printed on or within structures of several inorganic material substrates while exhibiting good wetting at the proposed conditions.

A deposition of a preceramic-based interfacial material can be conducted at a reasonable low temperature (<500° C.) to avoid damaging the printed inorganic structure, but this interfacial material can survive high-temperature printing (600° C. to 2000° C.) to hold and separate the printing of inorganic material. In existing printing systems, the melting point can be used to control the printing profile. In the present teachings, a phase changing is implemented after printing to raise the melting point by more than 1000° C. The present teachings further provide a formulation and printing profile used to print preceramic resin at relatively low temperature and then pyrolyze the resin to generate graphite interface for inorganic, in examples, metal, material printing. The demonstrated printing profile as well as the formulation ensures the printability and the microstructure of the pyrolyzed structure for good wettability with the printed inorganic material. Depending on the type of inorganic material, its deposition temperature can range from 300° C. (sodium nitrate, NaNO3) 660° C. (aluminum), 960° C. (silver), to 1100° C. (copper), a material that can be synchronized into the deposition procedure and used as a temporary interface or a mold will extend the complexity of the shape of the deposited inorganic material. A formulation and printing profile and method for preceramic resin printing can serve to control morphology of the interfacial layer for good wetting interfaces in inorganic material printing.

FIG. 1 depicts a schematic cross-sectional view of a single liquid metal ejector jet of a 3D printer (e.g., a MHD printer and/or multi-jet printer) used in additive manufacturing, in accordance with the present disclosure. FIG. 1 depicts a schematic cross-sectional view of a single liquid metal ejector jet of a 3D printer (e.g., a MHD printer and/or multi-jet printer), in accordance with the present disclosure. FIG. 1 shows a portion of a type of drop-on-demand (DOD) or three-dimensional (3D) printer 100. The 3D printer or liquid ejector jet system 100 may include an ejector (also referred to as a body or pump chamber, or a "one-piece" pump) 104 within an outer ejector housing 102, also referred to as a lower block. The ejector 104 may define an inner volume 132 (also referred to as an internal cavity or an inner cavity). A printing material 126 may be introduced into the inner volume 132 of the ejector 104. This inner volume 132 may be considered a reservoir configured to receive and melt a print material within the inner volume 132 of the ejector 104. The printing material 126 may be or include a metal, a polymer, or the like. It should be noted that alternate jetting technology aside from MHD as described herein may be necessary depending on the nature and properties of the print material used in examples of the present disclosure. For example, the printing material 126 may be or include aluminum or aluminum alloy, introduced via a printing material supply 116 or spool of a printing material wire feed 118, in this case, an aluminum wire. The liquid ejector jet system 100 further includes a first inlet 120 within a pump cap or top cover portion 108 of the ejector 104 whereby the printing material wire feed 118 is introduced into the inner volume 132 of the ejector 104. The ejector 104 further defines a nozzle 110, an upper pump 122 area and a lower pump 124 area. One or more heating elements 112 are distributed around the pump chamber 104 to provide an elevated temperature source and maintain the printing material 126 in a molten state during printer operation. The heating elements 112 are configured to heat or melt the printing material wire feed 118, thereby changing the printing material wire feed 118 from a solid state to a liquid state (e.g., printing material 126) within the inner volume 132 of the ejector 104. The three-dimensional 3D printer 100 and ejector 104 may further include an air or argon shield 114 located near the nozzle 110, and a water coolant source 130 to further enable nozzle and/or ejector 104 temperature regulation. The liquid ejector jet system 100 further includes a level sensor 134 system which is configured to detect the level of molten printing material 126 inside the inner volume 132 of the ejector 104 by directing a detector beam 136 towards a surface of the printing material 126 inside the ejector 104 and reading the reflected detector beam 136 inside the level sensor 134.

The 3D printer 100 may also include a power source, not shown herein, and one or more metallic coils 106 enclosed in a pump heater that are wrapped at least partially around the ejector 104. The power source may be coupled to the coils 106 and configured to provide an electrical current to the coils 106. This electrical current can be provided as a pulse, which is delivered at a specific frequency, wherein the frequency determines a rate at which a pulse is delivered to the coils 106, and therefore how often a drop may be ejected from the ejector 104. An increasing magnetic field caused by the coils 106 may cause an electromotive force within the ejector 104, that in turn causes an induced electrical current in the printing material 126. The magnetic field and the induced electrical current in the printing material 126 may create a radially inward force on the printing material 126, known as a Lorenz force. The Lorenz force creates a pressure at an inlet of a nozzle 110 of the ejector 104. The pressure causes the printing material 126 to be jetted through the nozzle 110 in the form of one or more liquid drops 128.

The 3D printer 100 may also include a substrate 144, or platform that is positioned proximate to (e.g., below) the nozzle 110. The ejected drops 128 may land on the substrate 144 and solidify to produce a 3D object. The 3D printer 100 may also include a substrate control motor that is configured to move the substrate 144 while the drops 128 are being jetted through the nozzle 110, or during pauses between when the drops 128 are being jetted through the nozzle 110, to cause the 3D object to have the desired shape and size. The substrate control motor may be configured to move the substrate 144 in one dimension (e.g., along an X axis), in two dimensions (e.g., along the X axis and a Y axis), or in three dimensions (e.g., along the X axis, the Y axis, and a Z axis). In another example, the ejector 104 and/or the nozzle 110 may be also or instead be configured to move in one, two, or three dimensions. In other words, the substrate 144 may be moved under a stationary nozzle 110, or the nozzle 110 may be moved above a stationary substrate 144. In yet another example, there may be relative rotation between the nozzle 110 and the substrate 144 around one or two additional axes, such that there is four or five axis position control. In certain examples, both the nozzle 110 and the substrate 144 may move. For example, the substrate 144 may move in X and Y directions, while the nozzle 110 moves up and/or down in a Y direction. For the purposes of this disclosure, a print bed may also refer to the substrate.

The 3D printer 100 may also include one or more gas-controlling devices, which may be or include a gas source 138. The gas source 138 may be configured to introduce a gas. The gas may be or include an inert gas, such as helium, neon, argon, krypton, and/or xenon. In another example, the gas may be or include nitrogen. The gas may include less than about 10% oxygen, less than about 5% oxygen, or less than about 1% oxygen. In at least one example, the gas may be introduced via a gas line 142 which includes a gas regulator 140 configured to regulate the flow or flow rate of one or more gases introduced into the three-dimensional 3D printer 100 from the gas source 138. For example, the gas may be introduced at a location that is above the nozzle 110 and/or the heating element 112. This may allow the gas (e.g., argon) to form a shroud/sheath around the nozzle 110, the drops 128, the 3D object, and/or the substrate 144 to reduce/prevent the formation of oxide (e.g., aluminum oxide) in the form of an air shield 114. Controlling the temperature of the gas may also or instead help to control (e.g., minimize) the rate that the oxide formation occurs.

The liquid ejector jet system 100 may also include an enclosure 102 that defines an inner volume (also referred to as an atmosphere). In one example, the enclosure 102 may be hermetically sealed. In another example, the enclosure 102 may not be hermetically sealed. In one example, the ejector 104, the heating elements 112, the power source, the coils, the substrate 144, additional system elements, or a combination thereof may be positioned at least partially within the enclosure 102. In another example, the ejector 104, the heating elements 112, the power source, the coils, the substrate 144, additional system elements, or a combination thereof may be positioned at least partially outside of the enclosure 102. While the liquid ejector jet system 100 shown in FIG. 1 is representative of a typical liquid ejector jet system 100, locations and specific configurations and/or physical relationships of the various features may vary in alternate design examples.

Printing systems as described herein or printing systems having other print material feeds and/or ejection systems may alternatively include other printing materials such as plastics or other ductile materials that are non-metals. The print material can include a metal, a metallic alloy, or a combination thereof. A non-limiting example of a printing material can include aluminum. Exemplary examples of printing systems of the present disclosure can include an ejector for jetting a print material, including a structure defining an inner cavity, and a nozzle orifice in connection with the inner cavity and configured to eject one or more droplets of liquid print material, wherein the ejector is configured to form objects, parts, interfacial materials, structures, or support structures as described herein for a three-dimensional printed part.

In other known methods, printers such as those shown in FIG. 1 include a controller that is configured to receive instructions from a computing device or programmed set of coordinates to operate the ejector head to construct various elements of a 3D object. The reservoir or inner volume is configured to receive and melt a print material, while the ejector having a nozzle is fluidly connected to the reservoir to receive melted print material from the reservoir. As the platform is positioned opposite the ejector, at least one actuator operatively connected to at least one of the platform and the ejector is present, where the at least one actuator is configured to move the at least one of the platform and the ejector relative to one another. The controller is further operatively connected to the reservoir, the at least one ejector, and the at least one actuator, the controller being configured to perform various printing method instructions as described herein for producing structures of a three-dimensional object or part as described herein.

An additive manufacturing system, can include one or more of the above-referenced features or aspects, including a reservoir configured to receive and melt a print material, an ejector having a nozzle that is fluidly connected to the reservoir to receive melted print material from the reservoir, a platform or substrate positioned opposite the ejector, at least one actuator operatively connected to at least one of the platform and the ejector, the at least one actuator being configured to move the at least one of the platform and the ejector relative to one another, and a controller operatively connected to the reservoir, the ejector, and the at least one actuator, the controller being configured to form a first layer, the first layer comprising at least one material chosen from an article material, a support structure material and an interfacial material, form an additional layer on the first layer, the additional layer comprising at least one material chosen from the article material, the support structure material and the interfacial material, and repeat the previous step one or more times to form a three-dimensional build comprising an article and at least one support structure attached to the article at an interface, the interface comprising the interfacial material formed during one or more of the preceding steps, the interfacial material comprising a polymer. In exemplary examples of the additive manufacturing system, the interfacial material includes a preceramic such as, but not limited to a phenolic resin or benzoxazine. This additive manufacturing system can form a printed article, including a three-dimensional article, a support structure attached to at least a portion of the three-dimensional article, and an interfacial material affixed between the three-dimensional article and the support structure, and wherein the interfacial material comprises a polymer. In examples, the interfacial material further comprises an inorganic filler such as aluminum oxide. The preceramic interfacial material may include a phenolic resin or benzoxazine resin, or a combination thereof, to produce a carbon matrix, polycarbosilane resin to produce a silicon carbide interfacial material, or polysiloxane to produce a silicon oxycarbide interfacial material, or a combination thereof. Besides a pure monomer, many variations of functionalized derivatives thereof may also be considered. These functionalizations can include additional reaction sites, additional branches, bi- or tri-structure of the monomer, and the like. The inorganic fillers are used to improve the char yield of the formulation. The fillers may include various kinds of ceramic or glass particles, such as but not limited to SiC, $Al_2O_3$, SiOC, $TiO_2$, and the like. The shapes of the fillers may be a sphere, cubit, whisker, short fiber, and a combination thereof. Illustrative examples of glass materials may include, but are not limited to boric oxide (450° C. melting point), phosphorus pentoxide (340° C. melting point), and manganese dioxide (353° C. melting point), combinations thereof, and the like.

Figure 2:
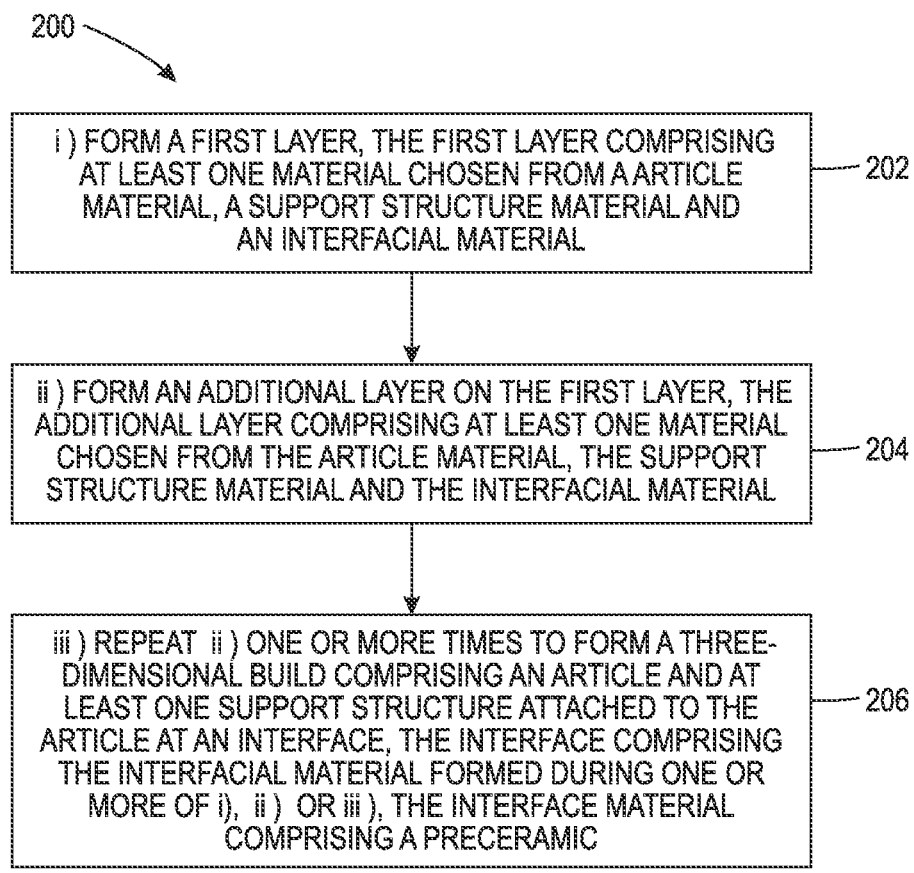
FIG. 2 is a flow chart of a method of additive manufacturing, in accordance with the present disclosure.

FIG. 2 is a flow chart of a method of additive manufacturing, in accordance with the present disclosure. The method of additive manufacturing 200, includes the steps of i) forming a first layer, the first layer comprising at least one material chosen from an article material, a support structure material and an interfacial material 202, ii) forming an additional layer on the first layer, the additional layer comprising at least one material chosen from the article material, the support structure material and the interfacial material 204, and iii) repeating ii) one or more times to form a three-dimensional build comprising an article and at least one support structure attached to the article at an interface, the interface comprising the interfacial material formed during one or more of i), ii) or iii), the interfacial material comprising a preceramic 206. Illustrative examples of the method of additive manufacturing 200 include wherein the additional layer comprises an interfacial material. In examples, the method of additive manufacturing 200 further includes pyrolyzing the interfacial material after forming the additional layer. In examples, the interfacial material includes benzoxazine, or an inorganic filler, such as aluminum oxide. In examples, the article material includes a metal or alternatively a material chosen from glass, salt, or a combination thereof. The method of additive manufacturing 200 can include where the interfacial material is deposited by ejection or can further include a step of removing a portion of the article from another portion of the article at an interface location. In examples, the pyrolyzing of the interfacial material is conducted at a higher temperature as compared to forming the article. In other examples, the pyrolyzing could occur at lower temperatures as compared to the article formation temperature. In examples, the support structure material comprises a metal, a glass, a salt, or a combination thereof. In examples, when depositing a preceramic interfacial material, an additional step can include conditioning a preceramic interfacial material to transform the preceramic material from an organic structure to an inorganic structure. For example, a benzoxazine preceramic interfacial material can be transformed or converted via said conditioning to a carbon-like inorganic material. This conditioning can be applied layer by layer, as the preceramic material is deposited, or alternatively applied after all the preceramic interfacial material has been deposited. The conditioning may include heating in an inert environment at a temperature from about 300° C. to about 900° C., with or without the assistance of pressure or vacuum.

The present disclosure provides an interfacial material using a high-temperature resistant polymer as interface or boundary to hold the drops of a molten inorganic material, such as metal, salt, or ceramic. In examples, the polymer is beyond its glass transition temperature when used or deposited. In previously known examples, holding molten inorganic materials at ambient conditions is difficult, because of the required high temperature (>300° C.), and resulting oxidation, corrosion, and reactions. In previous examples, there is no method of how to provide an interface layer that may withstand high melting temperature materials, such as copper. The usage of preceramic resin as interfacing material for inorganic material printing is provided herein to solve this problem, including deposition of an interfacial material at 150° C., pyrolyzing at 400° C., interlayer from 300° C. to 600° C. (ambient) to 1600° C. (inert).

Examples of the methods demonstrated and described herein further provide two methods to remove the interface, provide an interface to separate printed aluminum at the interface, and demonstrate printability of the methods described herein. Further provided is a surface roughness printing condition, whereby the surface roughness of a deposited interfacial material influences the attachment of the drop-deposited inorganic materials. Additionally, the gas emission during the pyrolyzing and the boiling during curing of a preceramic interfacial material provides a roughened surface thereby preventing an integrated dropped inorganic film forming material. The surface roughness of a deposited interfacial material can be from about 0.10 microns to about 1 micron in surface roughness. The addition of metal oxide fillers, such as silicon dioxide, aluminum oxide, and others can be used. The addition of fillers further serves to stabilize the surface structure to reduce the roughness, as well as stabilize and anchor the material during curing and increase the thermal conductivity to control the temperature. This method can be used for inorganic printing materials, such as metals including copper, steel, as well as others described herein.

With respect to the surface roughness of the deposited preceramic material formulations provided herein, the addition of the metal oxide fillers can influence the structure and increase the surface roughness, thereby improving the inorganic film forming upon an interfacial material. Several removal methods of interfaces or parts including interfacial materials can include mechanical scratching or burning. Mechanical scratching involves removing the bonding between copper and a printed aluminum being weak at an interface. Upon pyrolyzing, the major composite of the pyrolyzed film is graphite which is brittle to break and does not adhere to any surface, thus facilitating removal or separation at the interface. Burning involves heating at 600° C. in ambient conditions to generate $CO_2$ to facilitate removal of the graphite-like material. Removal can further be accomplished by prying or burning to weaken the interface and separate. During or after deposition, the material can be heated to a first temperature range to flow the interfacial material. During pyrolyzing, the liquid polymer preceramic is polymerized or cured, then transitions upon further heating to a ceramic or graphite-like material. An aluminum or other inorganic printing material can be deposited after the interfacial material is pyrolyzed. In examples, the temperature for pyrolyzing is close to an aluminum printing, ejecting, or depositing temperature.

Preceramic materials can be deposited by ejection or printing, or alternatively via manual deposition from a liquid precursor, such as pouring or brushing. In addition, syringe-deposition, extrusion, spraying, dipping, or other liquid application methods known to one skilled in the art can alternatively be utilized. If the preceramic material is heated above its melting point, it can be poured or brushed onto the desired surface, then heated to a sufficient temperature to be controllably pyrolyzed. When using preceramic resin as an interface between aluminum printing, the preceramic resin can be deposited on part of the printed aluminum, followed by another layer of aluminum being printed on top of the interface. The aluminum on top of the preceramic resin can be peeled, or alternatively integrated into a 3D object or part.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method of additive manufacturing, the method comprising:
   i) forming a first layer, the first layer comprising at least one material chosen from an article material, a support structure material and an interfacial material;
   ii) forming an additional layer on the first layer, the additional layer comprising the interfacial material;
   iii) repeating ii) one or more times to form a three-dimensional build comprising an article and at least one support structure attached to the article at an interface, the interface comprising the interfacial material formed during one or more of i), ii) or iii), the interfacial material comprising a preceramic; and
   iv) conditioning the preceramic interfacial material to transform the preceramic material from an organic structure to an inorganic structure; and wherein:
   the conditioning is applied layer by layer.

2. The method of additive manufacturing of claim 1, further comprising pyrolyzing the interfacial material after forming the additional layer.

3. The method of additive manufacturing of claim 1, wherein the conditioning further comprises heating in an inert environment at a temperature from about 300° C. to about 900° C.

4. The method of additive manufacturing of claim 1, wherein the interfacial material comprises benzoxazine.

5. The method of additive manufacturing of claim 1, wherein the interfacial material comprises an inorganic filler.

6. The method of additive manufacturing of claim 5, wherein the inorganic filler comprises aluminum oxide.

7. The method of additive manufacturing of claim 1, wherein the article material comprises a metal.

8. The method of additive manufacturing of claim 1, wherein the article material comprises a material chosen from glass, salt, or a combination thereof.

9. The method of additive manufacturing of claim 1, wherein the interfacial material is deposited by ejection.

10. The method of additive manufacturing of claim 1, further comprising removing a portion of the article from another portion of the article at an interface location.

11. The method of additive manufacturing of claim 2, wherein pyrolyzing the interfacial material is conducted at a higher temperature as compared to forming the article.

12. The method of additive manufacturing of claim 1, wherein the support structure material comprises a metal, a glass, a salt, or a combination thereof.

13. An additive manufacturing system, comprising:
   a reservoir configured to receive and melt a print material;
   an ejector having a nozzle that is fluidly connected to the reservoir to receive melted print material from the reservoir;
   a platform positioned opposite the ejector;
   at least one actuator operatively connected to at least one of the platform and the ejector, the at least one actuator being configured to move the at least one of the platform and the ejector relative to one another; and
   a controller operatively connected to the reservoir, the ejector, and the at least one actuator, the controller being configured to:
   i) form a first layer, the first layer comprising at least one material chosen from an article material, a support structure material and an interfacial material;

ii) form an additional layer on the first layer, the additional layer comprising the interfacial material;

iii) repeat ii) one or more times to form a three-dimensional build comprising an article and at least one support structure attached to the article at an interface, the interface comprising the interfacial material formed during one or more of i), ii) or iii), the interfacial material comprising a preceramic; and iv) conditioning the preceramic interfacial material to transform the preceramic material from an organic structure to an inorganic structure; and wherein:

the conditioning is applied layer by layer.

14. The additive manufacturing system of claim 13, wherein the controller is further configured to pyrolyze the interfacial material after forming the additional layer.

15. The additive manufacturing system of claim 13, wherein the interfacial material comprises benzoxazine.

16. The additive manufacturing system of claim 13, wherein the interfacial material comprises an inorganic filler.

* * * * *